United States Patent
Segura

(10) Patent No.: US 9,830,610 B1
(45) Date of Patent: *Nov. 28, 2017

(54) SYSTEMS AND METHODS FOR AUTOMATED BENEFIT VERIFICATION AND APPLICATION

(71) Applicant: United Services Automobile Association (USAA), San Antonio, TX (US)

(72) Inventor: Michele Segura, Fair Oaks Ranch, TX (US)

(73) Assignee: UNITED STATES AUTOMOBILE ASSOCIATION (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/442,450

(22) Filed: Feb. 24, 2017

Related U.S. Application Data

(63) Continuation of application No. 14/594,420, filed on Jan. 12, 2015, now Pat. No. 9,595,044, which is a continuation of application No. 11/459,903, filed on Jul. 25, 2006, now Pat. No. 8,931,694.

(51) Int. Cl.
*G06Q 30/02* (2012.01)

(52) U.S. Cl.
CPC ..... *G06Q 30/0225* (2013.01); *G06Q 30/0238* (2013.01)

(58) Field of Classification Search
None
See application file for complete search history.

(56) References Cited

U.S. PATENT DOCUMENTS

| | | | |
|---|---|---|---|
| 4,882,675 A | 11/1989 | Nichtberger et al. |
| 5,642,485 A | 6/1997 | Deaton et al. |
| 5,689,100 A | 11/1997 | Carrithers et al. |
| 5,905,246 A | 5/1999 | Fajkowski |
| 6,292,786 B1 | 9/2001 | Deaton et al. |
| 6,684,269 B2 | 1/2004 | Wagner |

(Continued)

OTHER PUBLICATIONS

Callidus Software Inc., "Sun Story, Success at a Glance," 3 pages, Mar. 20, 2006.

(Continued)

*Primary Examiner* — Kristy A Haupt
(74) *Attorney, Agent, or Firm* — Perkins Coie LLP

(57) ABSTRACT

Systems and methods for providing automated benefit verification and application are described. The apparatus may include a receiving module to receive a transaction, a transaction processing module to process the transaction and parse a unique identifier, a verification module to verify eligibility for a benefit and a data store to store a plurality of unique identifiers. The method may comprise receiving a credit card transaction, determining if a unique identifier contained within the transaction matches one of a stored listing and prompting a user to accept a benefit if the unique identifier matches one of the stored listing. The method may, alternatively, comprise processing a payment device, determining if the user is entitled to a benefit based on information contained within the payment device, prompting the user to accept or decline the benefit and providing the benefit if accepted.

20 Claims, 5 Drawing Sheets

(56) References Cited

U.S. PATENT DOCUMENTS

| | | |
|---|---|---|
| 6,885,994 B1 | 4/2005 | Scroggie et al. |
| 6,920,611 B1 | 7/2005 | Spaeth et al. |
| 6,993,498 B1 | 1/2006 | Deaton et al. |
| 7,059,531 B2 | 6/2006 | Beenau et al. |
| 7,092,905 B2 | 8/2006 | Behrenbrinker et al. |
| 7,516,883 B2 | 4/2009 | Hardesty et al. |
| 8,931,694 B1 | 1/2015 | Segura |
| 9,595,044 B1 * | 3/2017 | Segura .................. G06Q 20/20 |
| 2003/0009382 A1 | 1/2003 | D'Arbeloff et al. |
| 2003/0130891 A1 | 7/2003 | Jacobs |
| 2003/0130895 A1 | 7/2003 | Antonucci et al. |
| 2003/0216967 A1 | 11/2003 | Williams |
| 2004/0238622 A1 | 12/2004 | Freiberg |
| 2005/0075932 A1 | 4/2005 | Mankoff |
| 2006/0004629 A1 | 1/2006 | Neemann et al. |
| 2006/0131392 A1 | 6/2006 | Cooper |
| 2006/0224449 A1 | 10/2006 | Byerley et al. |
| 2006/0289631 A1 | 12/2006 | Stretch et al. |
| 2008/0010189 A1 | 1/2008 | Rosenberger |

OTHER PUBLICATIONS

Citigroup, "CitiÒ / AAdvantageÒ Cards," 1 page, 2006.

Consistent Image Web Design, "E-Commerce Sites," 4 pages, 2006.

Data Guard Systems, "Accepting Bill Payments—Increasing Foot Traffic and Turning a Profit," 8 pages, 2005.

Iventa Corporation, "Complete E-Commerce System," 4 pages, 2006.

Marriott International, Inc., "Internet Privacy Statement," 10 pages, 2006.

National Federation of Independent Business, "Solveras Payment Systems," 1 page, 2006.

U.S. Appl. No. 11/459,898, Non-Final Office Action, 12 pages, dated Oct. 26, 2007.

U.S. Appl. No. 11/459,907, Non-Final Office Action, 12 pages, dated Jul. 26, 2007.

U.S. Appl. No. 11/459,907, Response, 14 pages, dated Nov. 26, 2007.

U.S. Appl. No. 11/459,911, Non-Final Office Action, 10 pages, dated Jun. 1, 2007.

U.S. Appl. No. 11/459,911, Response, 14 pages, dated Oct. 26, 2007.

U.S. Appl. No. 11/459,916, Non-Final Office Action, 13 pages, dated Jul. 26, 2007.

U.S. Appl. No. 11/459,916, Response, 16 pages, dated Nov. 26, 2007.

* cited by examiner

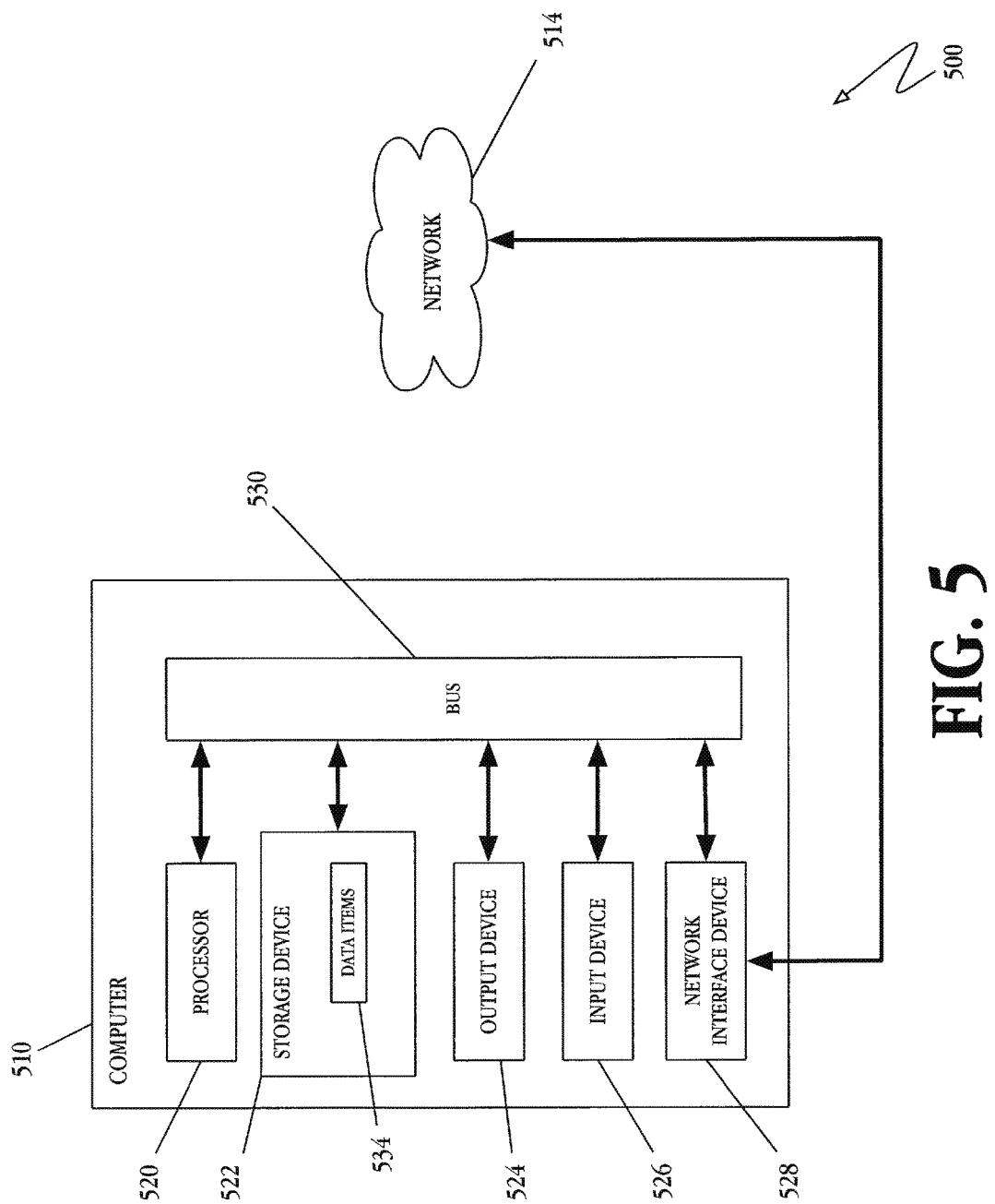

SYSTEMS AND METHODS FOR AUTOMATED BENEFIT VERIFICATION AND APPLICATION

This application is a continuation of U.S. patent application Ser. No. 14/594,420, filed Jan. 12, 2015, entitled "SYSTEMS AND METHODS FOR AUTOMATED BENEFIT VERIFICATION AND APPLICATION," which is a continuation of U.S. patent application Ser. No. 11/459,903, filed on Jul. 25, 2006, entitled "SYSTEMS AND METHODS FOR AUTOMATED BENEFIT VERIFICATION AND APPLICATION," now U.S. Pat. No. 8,931,694, each of which are hereby incorporated by reference for all purposes in their entireties. This disclosure is related to U.S. Pat. No. 7,784,683, entitled "SYSTEMS AND METHODS FOR AUTOMATED BENEFIT VERIFICATION AND APPLICATION," filed on Jul. 25, 2006, and U.S. patent application Ser. No. 11/459,898, entitled "SYSTEMS AND METHODS FOR AUTOMATED BENEFIT VERIFICATION AND APPLICATION," filed on Jul. 25, 2006, now abandoned, both of which are hereby incorporated by reference for all purposes in their entireties.

TECHNICAL FIELD

This application relates to systems and methods for verifying a benefit and applying the benefit to a transaction and more particularly to automated verification of a benefit and application of the benefit.

BACKGROUND

Customers demand more of the products and services they use then ever before. They insist that the companies they deal with on a regular basis provide them greater and greater levels of convenience. One specific example of this increasing convenience is the use of credit cards or debit cards at the points of purchase.

When a customer presents a credit card at a merchant, many systems the customer has no awareness of are required to verify the customer's identity and ability to purchase. The merchant itself has a system at the point of sale which can read the credit card, or a point of sale device. This may be contained within a cash register. Or it may be a simple device that is accessible to the customer which they can use at their own initiative by swiping their credit card at the time of purchase. The device contacts a merchant bank with a verification request. The merchant bank typically services a number of merchants in this fashion. The merchant through their systems guarantees payment to the merchant if they approve the transaction. Before automated systems like those in use today, a merchant had to maintain a printed publication to perform this verification. The merchant bank, typically contacts the bank that issued the credit card to verify the transaction. The issuing bank will check if the customer has sufficient credit limit to continue the transaction. Through this mechanism, the customer can present their credit card, buy the product and the merchant can be paid for that purchase. Should the customer have defrauded the merchant with a fraudulent card that was verified, the merchant will still be paid by the merchant bank if such an agreement is entered into.

One of the advantages this provides to the merchant is that by reading the information on the credit card, which is contained within the magnetic strip or in a processing device in the card itself, and greet the customer by name. This provides a level of intimacy and customer specific contact that is believed to increase customer satisfaction and retention.

SUMMARY

In an embodiment, an apparatus for verifying eligibility for a benefit comprises a receiving module to receive one or more transactions, a transaction processing engine to process the transaction, a verification module to receive a unique identifier and determine, based on the unique identifier, and a data store to store one or more unique identifiers. In an embodiment, a method of providing benefits to a customer includes receiving a payment indication from a customer, the payment indication including an account number having a unique identifier, determining if the unique identifier matches one in a stored list, and prompting the customer to accept a benefit if the unique identifier matches one in a stored list. In an embodiment, a method of dynamically verifying and applying an end-user benefit comprises, processing a payment device, the payment device containing information about the entity issuing the device, determining if the user is entitled to one or more benefits based on the information, prompting the user to accept or decline the one or more benefits, and providing the benefit to the user if the user accepts.

BRIEF DESCRIPTION OF DRAWINGS

Embodiments are illustrated by way of example and not limitation in the figures of the accompanying drawings, in which like references indicate similar elements and in which:

FIG. 5 shows a block diagram of a machine including instructions to perform any one or more of the methodologies described herein.

DETAILED DESCRIPTION

In the following detailed description of example embodiments, reference is made to the accompanying drawings, which form a part hereof, and in which is shown, by way of illustration, specific embodiments in which the example method, apparatus, and system may be practiced. It is to be understood that other embodiments may be utilized and structural changes may be made without departing from the scope of this description.

The term benefit as used in the present discussion is meant to denote any alteration of a transaction between a customer and a merchant that is to the customer's benefit. Benefit could include, without limitation, any or all of the following: a percentage discount off a purchase price, an additional item included as a gift during a purchase, an upgrade for a service purchased, and the like. Typically, these benefits are offered by a merchant direct to its customers. In the context of the present discussion, the benefit described herein is a benefit that is negotiated for on behalf of a customer by an entity that provides a payment device to the customer. This entity, in the context of credit cards, would be known as an issuing bank. The issuing bank may negotiate directly with the merchant so that all of the issuing banks customers receive this negotiated benefit.

Figure 1:
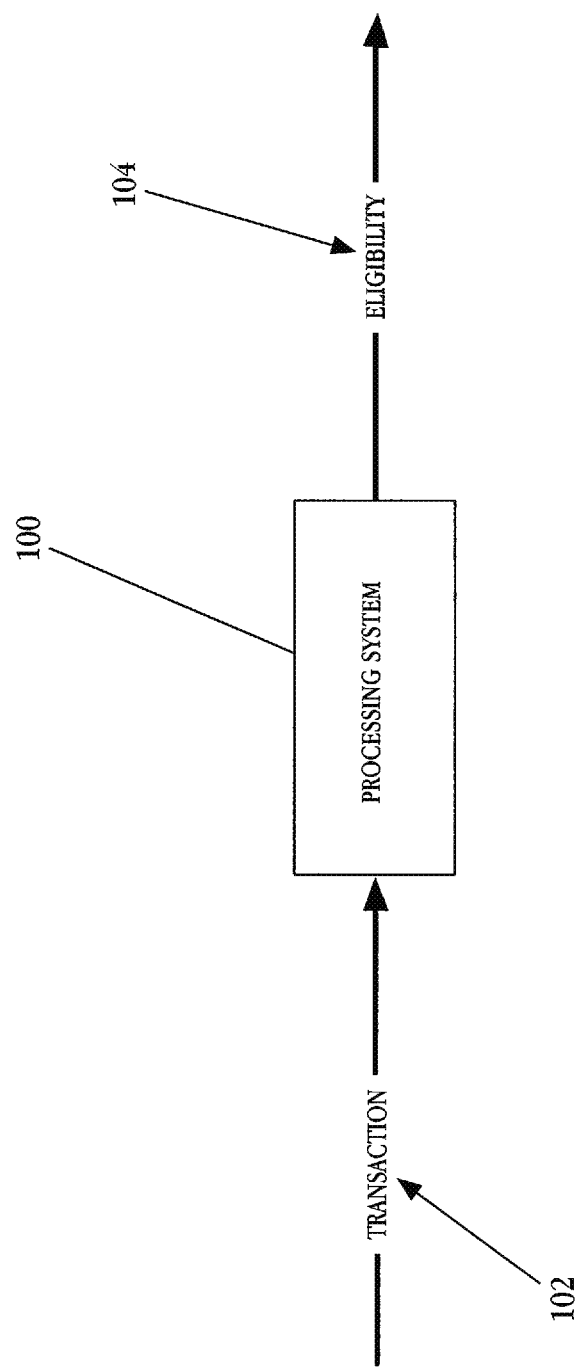
FIG. 1 shows a high level block diagram of an apparatus for benefit verification and application, in accordance with an example embodiment.

FIG. 1 shows a high level block diagram of an apparatus for benefit verification and application, in accordance with an example embodiment. In an embodiment, a processing system 100 receives a transaction 102 as an input and outputs an eligibility decision 104. The transaction may include, without limitation, a credit card transaction, a debit card transaction, a charge card transaction, a stored value card transaction, a gift card transaction, a transaction using a financial account such as a checking or saving account, or any suitable financial device. Though specific mention of various financial devices are used, this is not meant to be limiting in any manner, and any activity that involves the purchasing of goods or services is considered to be a transaction and within the scope of the present discussion.

In an embodiment, the processing system 100 is deployed at a merchant location, such as a store. During the purchase of an item, a customer presents a financial device and begins the transaction 102 for purchase, in one example. The financial device of the customer is issued by a financial institution. One example of such a financial device is a credit card. The credit card represents an agreement between the issuing bank and the customer, that agreement being that the issuing bank agrees to provide funds for the present purchase of items by the customer, and the customer agrees to pay the issuing bank back those funds. The agreement may further stipulate that the customer pays some additional amount to the issuing bank for these privileges, such as interest applied to the funds provided, or a periodic account fee.

In one embodiment, the issuing bank arranges for benefits to be provided by one or more vendors to the customers that have credit cards, or other financial devices, issued to them. One example may be a straight discount off the purchase price. In this example, the customer may positively identify themselves as being a customer of the bank issuing the credit card and requesting the discount they know they are entitled to. However, the customer may not be aware of the all the benefits arranged for by the issuing bank. In an embodiment, the processing system 100 dynamically determines the customer's eligibility for the benefit during the processing of the transaction. In another example of a benefit may include where the transaction is a electronic gift card or stored value card. In such an example, the issuing bank may negotiate for customers to be provided a gift card which has a value greater then the purchase price, such as a $30 gift card that was purchased by the customer for $25.

Figure 2:
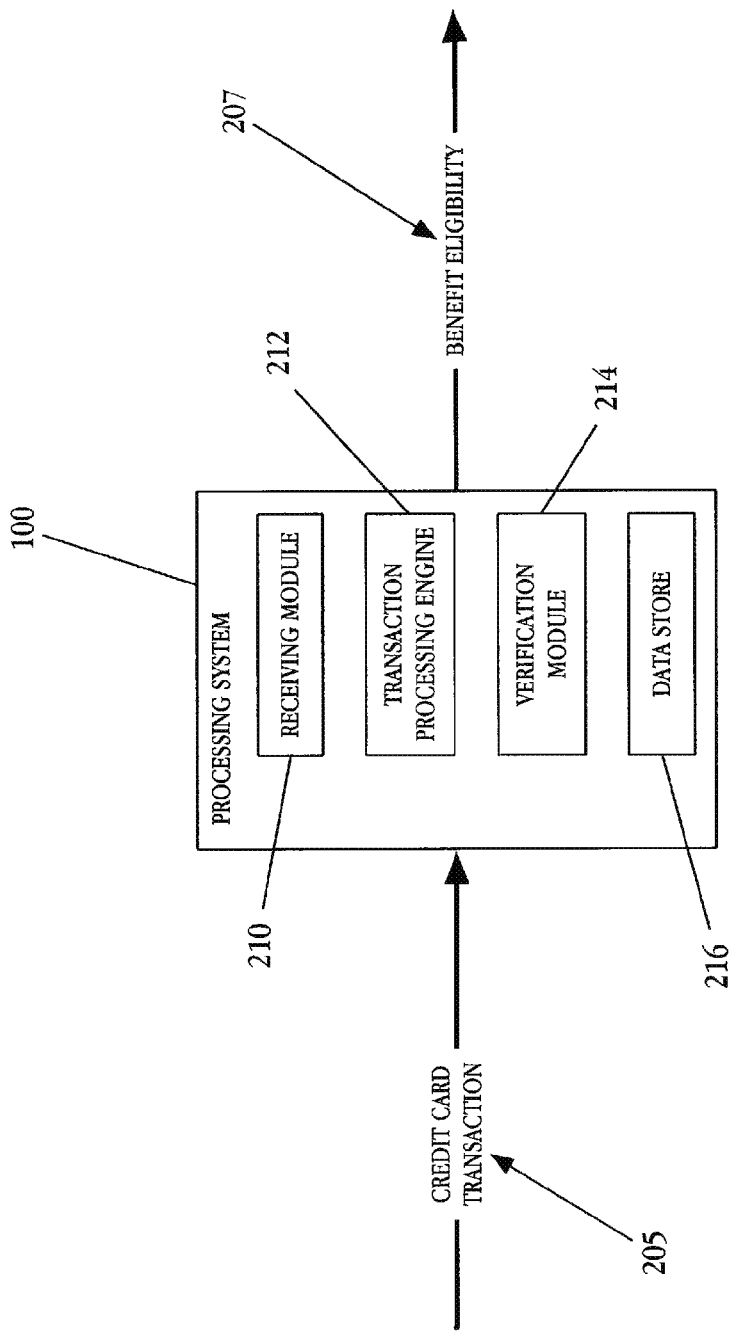
FIG. 2 show a more detailed block diagram of an apparatus for benefit verification and application, in accordance with an example embodiment.

FIG. 2 shows a more detailed block diagram of an apparatus for benefit verification and application, in accordance with an example embodiment. In an embodiment, the processing system 100 receives a credit card transaction 205 as an input and determines the eligibility for a benefit, or benefit eligibility 207, as an output. The use of a credit card transaction as an input in FIG. 2 is merely meant to be illustrative, and any transaction, as discussed above, could be used as an input to the processing system 100 described here. The processing system 100, in an embodiment, includes a receiving module 210, a transaction processing engine 212, a verification module 214 and a data store 216. In one embodiment, the processing system 100 is deployed at a merchant location, such as a store. In an alternate embodiment, the processing system 100 is deployed at a merchant bank.

In an embodiment, the receiving module 210 is configured to receive a transaction. In one embodiment, the receiving module 210 receives the transaction from a point-of-sale device. In another embodiment, the receiving module 210 receives the transaction from an internet-enabled user interface, the internet-enabled user interface accessible to a customer over a network, such as the internet. Transaction may include, without limitation, point-of-sale purchase of goods or services, purchase of goods or services over a Public Switched Telephone Network (PSTN) while interacting with an agent, purchase of goods or services from a network accessible web server, and the like.

In an embodiment, the transaction processing engine 212 is configured to process the transaction and to parse a unique identifier within the transaction. The transaction processing engine 212 is coupled to the receiving module and processes the transaction received by the receiving module, in one example. Parse, within the context of the present discussion, includes determining a unique identifier contained within the transaction. The unique identifier may include, without limitation, a bank identification number (BIN), a credit card account number, an account number, or a number unique to the customer purchasing the goods or services. The BIN, as one example, is a number contained within a credit or debit card account number that is indicative of the financial institution issuing the credit or debit card. Credit card or debit card account numbers, as another example, contain within them some identifier specific to the entity issuing the card. In such an example, though the individual credit card account numbers are unique across the entirety of the customers of that entity, each of those account numbers can be parsed to determine the issuing entity.

In an embodiment, the verification module 214 receives the unique identifier and determines if the transaction is eligible for a benefit. Benefit may include, without limitation, a discount on the purchase price of the goods or services, additional goods or services provided at the time of purchase, and the like. The verification module 214 is coupled to the transaction processing engine 212 and receives the unique identifier parsed from the transaction. The verification module 214, in an alternate embodiment, can receive the unique identifier and query an external device, such as a device operated by the issuing entity, to determine both the applicability of a benefit and the proper benefit to be applied. In such an example, the verification module 214 uses the unique identifier to identify which device to query. With respect to the proper benefit, in some embodiments, differing benefits may be applicable to different customers. For example, the issuing entity may have negotiated a base benefit for all of its customers of a 10% discount on the purchase price, but negotiated a further benefit of an additional 5% discount for customers that have been held that payment device for a long period of time. Expanding on this, the customer who has had a credit card from a specific issuing entity for 10 years can be treated differently from a new customer. In both cases, the customer would receive a benefit, but the customers that have shown loyalty will be afforded a greater benefit, incenting the newer customers to maintain their relationship with the issuing entity in order to get those further benefits.

In an embodiment, the data store 216 stores the one or more unique identifiers. In one embodiment, each of the unique identifier identifies an issuing entity which has negotiated for a benefit from a merchant. In an alternate embodiment, the issuing entity negotiates for a benefit for some or all of its customers and provides the credit or debit card account number of each of those customers. In such an example, the data store 216 would store each of the credit or debit card account numbers, and that number would be the unique identifier described above. Further, the act of parsing the unique identifier discussed above with respect to the transaction processing module would be parsing out the entire credit or debit account number from the transaction.

The processing system 100 described above with respect to FIG. 1 and the modules described above with respect to FIG. 2 may be implemented in hardware, software or firmware. Although depicted as separate modules, the functionality described above with respect to each of the modules may be combined with other modules without departing from the scope of the present application.

Figure 3:
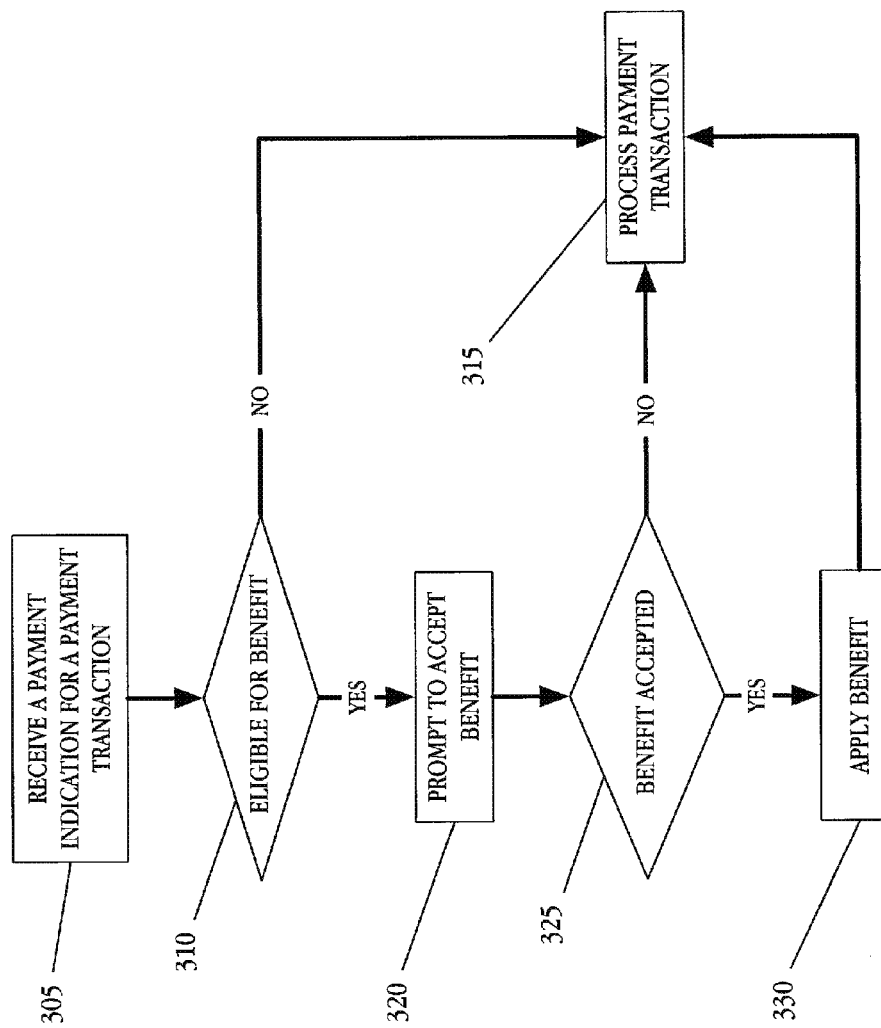
FIG. 3 shows a flow diagram of a method of automated benefit verification and application, in accordance with an example embodiment.

FIG. 3 shows a flow diagram of a method of automated benefit verification and application, in accordance with an example embodiment. The method depicted in FIG. 3 may be carried out by the apparatus discussed above with respect to FIG. 2. In one embodiment, the method may be carried out at a point of sale. In an alternate embodiment, the method may be carried out by a merchant bank, the merchant bank providing payment processing services to one or more merchants.

At block 305, a transaction is received. The transaction may include without limitation, a credit card transaction, a debit card transaction, or a transaction using any suitable payment device. The transaction may be received at a point of sale device, by a call center representative over the phone, over the web on an e-commerce web site, and the like. Payment device, as discussed above, may include, without limitation, credit card, debit card, checking account draft or check, brokerage account, savings account draft, or any suitable device or method by which to affect payment for a good or service.

At block 310, it is determined whether the customer is eligible for a benefit for the transaction. In one example, the customer is not aware that the entity from which they were issued the payment device has negotiated a benefit for all of its customers. In another example, the customer may be aware that the entity has negotiated such benefit but has forgotten to ask for such benefit at the time of payment. Using information contained within the payment transaction, such as the BIN within the credit card number, eligibility is determined, in one example. In another example, the entire credit card number is used to determine eligibility. If the customer is not eligible for a benefit as determined at block 310, the payment transaction is processed without the benefit at block 315. In yet another example, information may be read from the magnetic strip contained in the credit card itself. The magnetic strip stores a variety of information about the holder of the credit card, some of which can be used to verify eligibility for a benefit, without using the credit card number, account number, or BIN, in some examples.

At block 320, the customer is prompted to accept the benefit. Prompting may include, without limitation: a pop-up window in a web browser, the pop-up window advising the customer that they are eligible for a benefit, the benefit type or amount, and querying them as to their acceptance; displaying a message on the point of sale device, the message advising the customer that they are eligible for a benefit, the benefit type or amount, and querying them as to their acceptance; displaying a message at the point of sale device cueing the operator of the point of sale device to relate the benefit to the customer and ask if they wish to accept it; or displaying a message to a call center agent providing purchase services to the customer, the message advising that the customer is eligible for a benefit, the benefit type or amount and querying the customer as to their acceptance of the benefit. Additional methods of prompting may include, without limitation, phone calls, email messages, instant messages and the like. These latter methods may create a more asynchronous user experience, but can be used in situations where the other methods of prompting may be unavailable or unwanted.

At block 325, the acceptance or non-acceptance of the benefit is applied to the methods depicted in FIG. 3. If the customer declines the benefit at block 325, the transaction for payment proceeds to block 315 and is processed without the application of the benefit. If the customer accepts the benefit at block 325, the benefit is applied to the transaction at block 330 and then the transaction is processed at block 315. As discussed above, the benefit may include a discount on the purchase price of the good or service, in one example. In such an example, if the purchase price was $100 and the discount was 10%, the customer would only be charged $90 when the transaction is finally processed at block 315. Alternatively, the benefit may include some additional item added to the transaction, such as including batteries for a battery-powered device. In that example, the batteries would be added to the transaction, but the customer would only be charged for the battery-powered device.

Figure 4:
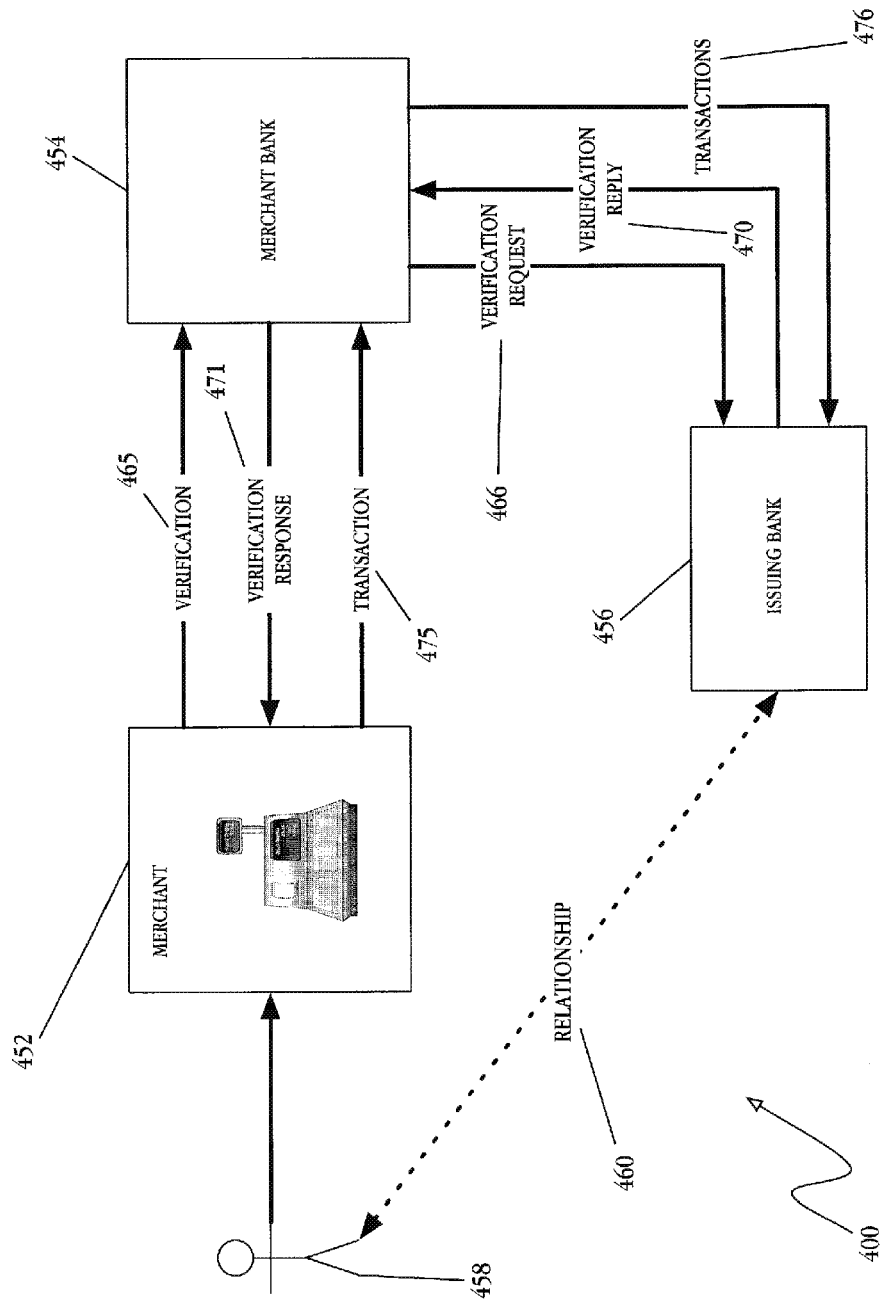
FIG. 4 shows a system for benefit verification and application, in accordance with an example embodiment.

FIG. 4 shows a system for benefit verification and application, in accordance with an example embodiment. The system 400 depicted in FIG. 4 shows an example system of processing transactions and affecting payment using a credit card. Such systems are in widespread use today, though used in conjunction with the apparatus and methods discussed above, the operations of the system 400 are modified in such a way as to verify eligibility for a benefit and applying that benefit. The system includes a merchant 452, a merchant bank 454, an issuing bank 456 and a customer 458. The system has equal applicability to the purchase of goods or services, though for the purposes of illustration, the purchase of a widget will be used.

The customer 458 has applied for and been provided a credit card by the issuing bank 456. The credit card is an agreement between the customer 458 and the issuing bank 456 that the issuing bank 456 will provide funds for the instant purchase of goods or services by the customer 458, and the customer 458 will pay back those funds, plus some service charge or interest. By entering into this agreement, the customer 458 and the issuing bank 456 have created a relationship 460 between them. For the purposes of this example, the issuing bank 456 desires to better their relationship with the customer 458 and negotiates to provide discounts on goods and services at selected merchants to their customer. In this example, the merchant 452 is a widget retailer. The merchant 452 sells widgets to any customer. However, the issuing bank 456 knows that its customers purchase many widgets from the merchant 452, and believes it can offer a discount benefit to their customers 458. The merchant 452 knows that by agreeing to that benefit, they will get more customers 458 who have credit cards with that issuing bank 456. Arguably, the merchant 452 may not make as much money on each transaction in this scenario, but will make up for it with increased sales.

The customer 458 goes to the merchant 452 and selects a widget for purchase. This widget costs $100 and they wish to pay for the widget with their credit card, issued by the issuing bank 456. As discussed above, the issuing bank 456 has negotiated a benefit for their credit card users. In this example, the benefit is a discount benefit of 10%. The customer presents their credit card to pay for the widget costing $100. The merchant may use any suitable transmission method and payment protocol. A generic protocol for payment transactions will be used in this example. Additionally, the methods and apparatus discussed here have equal applicability where no merchant bank is used.

Following presentation of the credit card for payment, a verification message 465 is formatted and sent from the merchant 452 to the merchant bank 454. The verification message 465 is intended to verify that the credit card presented is valid and warrant that the merchant will be paid for the goods purchased. The methods discussed above with respect to FIG. 3 may be performed at the merchant location or at the merchant bank. If performed at the merchant location, the device used to perform the payment transaction is configured similarly to that described above in FIG. 2. If performed at the merchant bank 454, a device similar to that described above in FIG. 2 can be used, with additional information stored in the data store with respect to the benefits offered by merchants for more then one issuing bank. In such an example, more then one issuing bank may negotiate for a benefit with the merchant. The data store maintained by the merchant bank 454 would need to store at least each of those benefits, matching merchant 452 and issuing bank 456, as well as the benefit type and amount. Further, the operations at block 315 discussed above would be modified to return a message to the merchant location, the message intended to cause the customer to be prompted to accept or deny the benefit, would be performed in addition to normal transaction processing.

In one scenario, the verification message 465 is received by the merchant bank 454 and a further verification request 466 is sent to the issuing bank 456. In this scenario, the issuing bank 456 verifies that the credit card presented is valid, and that the account has sufficient credit or funds available. In response to the verification request 466, the issuing bank 456 sends a verification reply 470 to the merchant bank 454. Applying the methods discussed above, the verification request 466 may additionally contain a query as to the amount of benefit to be applied, in some examples. Such a query can be used when the issuing bank negotiates varying benefits for its customers. The verification reply 470 contains an approval or denial of the transaction, which is then sent from the merchant bank 454 to the merchant 452 in a verification response 471. The transaction can then proceed, either with the benefit applied or not, and the transaction 475 is then sent to the merchant bank 454. The merchant bank 454 may then queue more then one transaction for a period of time and send a batch of transactions 476 to the issuing bank. The purpose of the batch of transactions is to request the funds to cover all of the transactions received from the merchant 452 using the merchant bank 454. Those funds can then be transferred to each of the merchants during overnight processing.

In an alternate scenario, the verification message 465 is received by the merchant bank 454 and no messages are sent to the issuing bank 456. In such an example, the merchant bank 454 performs its own verification without information from the issuing bank 456. Applying the methods discussed above, the merchant bank 454 may also verify the eligibility of the customer for a benefit. As part of the verification response 471, such eligibility would be sent.

FIG. 5 shows a block diagram of a machine including instructions to perform any one or more of the methodologies described herein. A system 500 includes a computer 510 connected to a network 514. The computer 510 includes a processor 520, a storage device 522, an output device 524, an input device 526, and a network interface device 528, all connected via a bus 530. The processor 520 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 520 executes instructions and includes that portion of the computer 510 that controls the operation of the entire computer. Although not depicted in FIG. 5, the processor 520 typically includes a control unit that organizes data and program storage in memory and transfers data and other information between the various parts of the computer 510. The processor 520 receives input data from the input device 526 and the network 514, reads and stores code and data in the storage device 522, and presents data to the output device 524.

Although the computer 510 is shown to contain only a single processor 520 and a single bus 530, the disclosed embodiment applies equally to computers that may have multiple processors, and to computers that may have multiple busses with some or all performing different functions in different ways.

The storage device 522 represents one or more mechanisms for storing data. For example, the storage device 522 may include read only memory (ROM), random access memory (RAM), magnetic disk storage media, optical storage media, flash memory devices, and/or other machine-readable media. In other embodiments, any appropriate type of storage device may be used. Although only one storage device 522 is shown, multiple storage devices and multiple types of storage devices may be present. Further, although the computer 510 is drawn to contain the storage device 522, it may be distributed across other computers, for example on a server.

The storage device 522 includes a controller (not shown in FIG. 5) and data items 534. The controller includes instructions capable of being executed on the processor 520 to carry out the functions, as previously described above with reference to FIGS. 1-4. In another embodiment, some or all of the functions are carried out via hardware in lieu of a processor-based system. In one embodiment, the controller is a web browser, but in other embodiments, the controller may be a database system, a file system, an electronic mail system, a media manager, an image manager, or may include any other functions capable of accessing data items. The storage device 522 may also contain additional software and data (not shown), which is not necessary to understanding the invention.

Although the controller and the data items 534 are shown to be within the storage device 522 in the computer 510, some or all of them may be distributed across other systems, for example on a server and accessed via the network 514.

The output device 524 is that part of the computer 510 that displays output to the user. The output device 524 may be a liquid crystal display (LCD) well-known in the art of computer hardware. But, in other embodiments the output device 524 may be replaced with a gas or plasma-based flat-panel display or a traditional cathode-ray tube (CRT) display. In still other embodiments, any appropriate display device may be used. Although only one output device 524 is shown, in other embodiments any number of output devices of different types, or of the same type, may be present. In an embodiment, the output device 524 displays a user interface.

The input device 526 may be a keyboard, mouse or other pointing device, trackball, touchpad, touch screen, keypad, microphone, voice recognition device, or any other appropriate mechanism for the user to input data to the computer 510 and manipulate the user interface previously discussed. Although only one input device 526 is shown, in another embodiment any number and type of input devices may be present.

The network interface device 528 provides connectivity from the computer 510 to the network 514 through any suitable communications protocol. The network interface device 528 sends and receives data items from the network 514.

The bus 530 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 510 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer 510. For example, other peripheral devices such as audio adapters or chip programming devices, such as EPROM (Erasable Programmable Read-Only Memory) programming devices may be used in addition to, or in place of, the hardware already depicted.

The network 514 may be any suitable network and may support any appropriate protocol suitable for communication to the computer 510. In an embodiment, the network 514 may support wireless communications. In another embodiment, the network 514 may support hard-wired communications, such as a telephone line or cable. In another embodiment, the network 514 may support the Ethernet IEEE (Institute of Electrical and Electronics Engineers) 802.3x specification. In another embodiment, the network 514 may be the Internet and may support IP (Internet Protocol). In another embodiment, the network 514 may be a local area network (LAN) or a wide area network (WAN). In another embodiment, the network 514 may be a hotspot service provider network. In another embodiment, the network 514 may be an intranet. In another embodiment, the network 514 may be a GPRS (General Packet Radio Service) network. In another embodiment, the network 514 may be any appropriate cellular data network or cell-based radio network technology. In another embodiment, the network 514 may be an IEEE 802.11 wireless network. In still another embodiment, the network 514 may be any suitable network or combination of networks. Although one network 514 is shown, in other embodiments any number of networks (of the same or different types) may be present.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
   receiving a transaction request for a transaction from a user at a point of sale device associated with a merchant; and
   determining, by the point of sale device, whether the user is eligible for a benefit based on an identify of the merchant,
   when the user is eligible for the benefit:
      determining, by the point of sale device, the benefit based on an identity of the user, wherein the benefit includes a base portion and an additional portion, the additional portion based on a length of time that the user has had an account with an issuing entity of a payment device used in the transaction, and
      applying, by the point of sale device, the benefit to the transaction.

2. The method of claim 1, wherein the benefit is a discount on a price of a good or service.

3. The method of claim 1, wherein when the user is eligible for the benefit, the method further comprises:
   prompting the user to accept or decline the benefit by displaying a message on the point of sale device indicating that the benefit is available, the message including a Yes/No prompt; and
   receiving a response to the Yes/No prompt from the user.

4. The method of claim 1, wherein the point of sale device is a web-enabled e-commerce engine.

5. The method of claim 4, wherein when the user is eligible for the benefit, the method further comprises:
   prompting the user to accept or decline the benefit by sending instructions to a computer operated by the user, the computer operated by the user communicatively coupled to the web-enabled e-commerce engine, the instructions causing a message to appear on a display device coupled to the computer, wherein the message includes information regarding the benefit the user is eligible for and a Yes/No prompt requiring a response from the user; and
   receiving the response to the Yes/No prompt.

6. The method of claim 1, wherein the method further comprises determining the identity of the user from information on a payment device associated with the transaction, wherein the payment device has an associated account number.

7. The method of claim 1, further comprising querying a database comprising a list of the merchants to determine whether the user is eligible for the benefit.

8. A non-transitory computer-readable storage medium containing a set of instructions that, when executed by one or more processors, cause a machine to:
   receive a transaction request for a transaction from a user at a point of sale device associated with a merchant; and
   determine whether the user is eligible for a benefit based on an identify of the merchant, when the user is eligible for the benefit:
      determine the benefit based on an identity of the user, wherein the benefit includes a base portion and an additional portion, the additional portion based on a length of time that the user has had an account with an issuing entity of a payment device used in the transaction, and
      apply the benefit to the transaction.

9. The non-transitory computer-readable storage medium of claim 8, wherein the benefit is a discount on a price of a good or service.

10. The non-transitory computer-readable storage medium of claim 8, wherein when the user is eligible for the benefit, the set of instructions, when executed by the one or more processors, further cause the machine to:
   prompt the user to accept or decline the benefit by displaying a message on the point of sale device indicating that the benefit is available, the message including a Yes/No prompt; and receive a response to the Yes/No prompt from the user.

11. The non-transitory computer-readable storage medium of claim 8, wherein the point of sale device is a web-enabled e-commerce engine.

12. The non-transitory computer-readable storage medium of claim 11, wherein when the user is eligible for the benefit, the set of instructions, when executed by the one or more processors, further cause the machine to:

prompt the user to accept or decline the benefit by sending instructions to a computer operated by the user, the computer operated by the user communicatively coupled to the web-enabled e-commerce engine, the instructions causing a message to appear on a display device coupled to the computer, wherein the message includes information regarding the benefit the user is eligible for and a Yes/No prompt requiring a response from the user; and receive the response to the Yes/No prompt.

13. The non-transitory computer-readable storage medium of claim 8, wherein the set of instructions, when executed by the one or more processors, further cause the machine to receive the identity of the user from information on a payment device associated with the transaction, wherein the payment device has an associated account number.

14. The non-transitory computer-readable storage medium of claim 8, wherein the set of instructions, when executed by the one or more processors, further cause the machine to query a database comprising a list of the merchants to determine whether the user is eligible for the benefit.

15. A system comprising:
one or more processors; and
computer-readable code that programs the one or more processors to:
receive a transaction request for a transaction from a user at a point of sale device associated with a merchant; and
determine whether the user is eligible for a benefit based on an identify of the merchant,
when the user is eligible for the benefit:
determine the benefit based on an identity of the user, wherein the benefit includes a base portion and an additional portion, the additional portion based on a length of time that the user has had an account with an issuing entity of a payment device used in the transaction, and
apply the benefit to the transaction.

16. The system of claim 15, wherein the benefit is a discount on a price of a good or service.

17. The system of claim 15, wherein when the user is eligible for the benefit, the computer-readable code further programs the one or more processors to:

prompt the user to accept or decline the benefit by displaying a message on the point of sale device indicating that the benefit is available, the message including a Yes/No prompt; and receive a response to the Yes/No prompt from the user.

18. The system of claim 15, wherein the point of sale device is a web-enabled e-commerce engine.

19. The system of claim 18, wherein when the user is eligible for the benefit, the computer-readable code further programs the one or more processors to:

prompt the user to accept or decline the benefit by sending instructions to a computer operated by the user, the computer operated by the user communicatively coupled to the web-enabled e-commerce engine, the instructions causing a message to appear on a display device coupled to the computer, wherein the message includes information regarding the benefit the user is eligible for and a Yes/No prompt requiring a response from the user; and receive the response to the Yes/No prompt.

20. The system of claim 15, wherein the computer-readable code further programs the one or more processors to receive the identity of the user from information on a payment device associated with the transaction, wherein the payment device has an associated account number.

\* \* \* \* \*